Oct. 27, 1959 W. PAULE 2,910,621
ELECTRICAL LIGHTING ARRANGEMENT
Filed Feb. 5, 1957 2 Sheets-Sheet 1
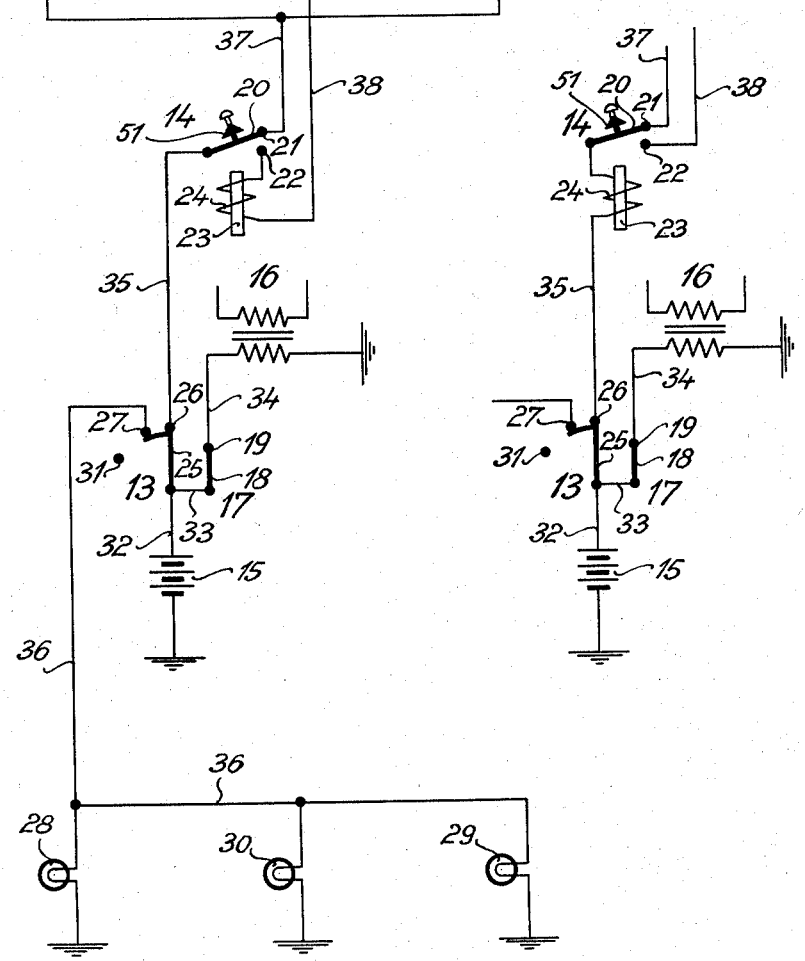
INVENTOR
Willy Paule
by Michael S. Striker
agt.

United States Patent Office 2,910,621
Patented Oct. 27, 1959

2,910,621

ELECTRICAL LIGHTING ARRANGEMENT

Willy Paule, Stuttgart-Obertuerkheim, Germany, assignor to Robert Bosch G.m.b.H., Stuttgart, Germany Application February 5, 1957, Serial No. 638,380

Claims priority, application Germany March 1, 1956

9 Claims. (Cl. 315—82)

The present invention relates to a lighting arrangement. More particularly, the present invention relates to a lighting arrangement for automotive vehicles capable of emitting either dim or bright light beams.

In conventional automotive vehicle lighting arrangements, the headlights of the automotive vehicle are provided with a bright filament for emitting a bright light beam and a dim filament for emitting a dim light beam onto the roadway in front of the automotive vehicle. It is conventional practice to have a dimmer switch, usually arranged on the floorboard of the automotive vehicle.

The dimmer switch is generally a manually operated switch which can be moved into position for energizing the dim light beam or the bright light beam.

Generally, the dimmer switch can be maintained in either of its two positions. Therefore if the bright beam is used, the bright filaments will remain energized as long as the main light switch and the dimmer switch remain in their respective circuit-closing positions. When the main light switch is turned off, the dimmer switch remains in its bright light position. Therefore, the next time that the main light switch is turned on the headlights of the car emit the bright light.

It is clear that this is an unsatisfactory arrangement since the operator of the automotive vehicle may not be aware that the bright lights are on in the automotive vehicle that is being driven. That is, in the event that the dimmer switch is in the bright light position before the main lights of the car are turned on, there is no positive action necessary on the part of the operator to energize the bright lights, other than to operate the main light switch to the on position.

On the other hand, with the present invention, it is impossible for the bright lights of the automotive vehicle to be illuminated without some positive action on the part of the operator after the main light switch has been turned on. This materially reduces the danger of light blindness which is a common cause of motor vehicle accidents during night driving.

It is accordingly an object of the present invention to overcome the disadvantages of the prior art conventional systems.

A second object of the present invention is to provide a new and improved lighting arrangement for automotive vehicles.

Another object of the present invention is to provide a new and improved lighting arrangement for automotive vehicles wherein the dimming switch must be independently operated in order to achieve its bright light position after the main light switch has been turned on.

A further object of the present invention is to provide a new and improved lighting arrangement for automotive vehicles wherein it would be impossible for the bright lights of the automotive vehicle to be turned on in the event that one of the bright filaments of the vehicle headlights has been opened.

Still another object of the present invention is to provide a new and improved lighting arrangement for automotive vehicles wherein the bright lights of the vehicle can be automatically operated to blink regardless of the position of the main light switch.

With the above objects in view, the present invention mainly consists of a lighting arrangement for automotive vehicles, including at least one light emitter having a first and a second filament for emitting respective light beams upon energization thereof, energizing means connected in circuit with the filaments for energizing the same, first switch means connected in circuit between the energizing means and the filaments and being movable between a circuit-closing position wherein at least one of the filaments is energized and a circuit-opening position wherein the filaments are deenergized, second switch means connected in circuit between the first switch means and the filaments and being movable between a first circuit-closing position wherein one of the filaments is energized and a second circuit-closing position wherein the other filament is energized, the second switch means including electromagnetic means connected in series with the first switch means, and means for normally urging the second switch means into the first circuit-closing position thereof whereby when the first switch means is in circuit-closing position thereof and the second switch means is in the second circuit-closing position thereof, current flows through the first switch and the electromagnetic means to maintain the second switch means in the second circuit-closing position thereof against the action of the urging means.

In a preferred embodiment of the present invention the automotive vehicle has two light emitters and the respective first and second filaments are connected in parallel. A dimmer switch is provided for the second switch means to either energize the first pair of parallel connected filaments to provide a dim light beam or the second pair of parallel connected filaments to provide a bright light beam. The electromagnetic means includes a holding coil for maintaining the dimmer switch in its position for energizing the bright light filaments.

In still another preferred embodiment, the means for urging the second switch means into its first circuit-closing position and the electromagnetic means are so constructed and arranged that in the event that one of the parallel connected filaments becomes open-circuited, the amount of current flowing through the electromagnetic means decreases below a level necessary to maintain the second switch means in its second circuit-closing position. Accordingly, the urging means returns the second switch means back into the first circuit-closing position thereof.

In yet another preferred embodiment of the present invention a third switch means is provided which is connected in circuit between the energizing means and the bright light filament so that the bright filaments can be energized to emit a bright light beam regardless of the position of the first and second switch means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an electrical schematic diagram of an embodiment of the present invention;

Fig. 2 is an electrical schematic diagram of a second embodiment of the present invention.

Figure 3:
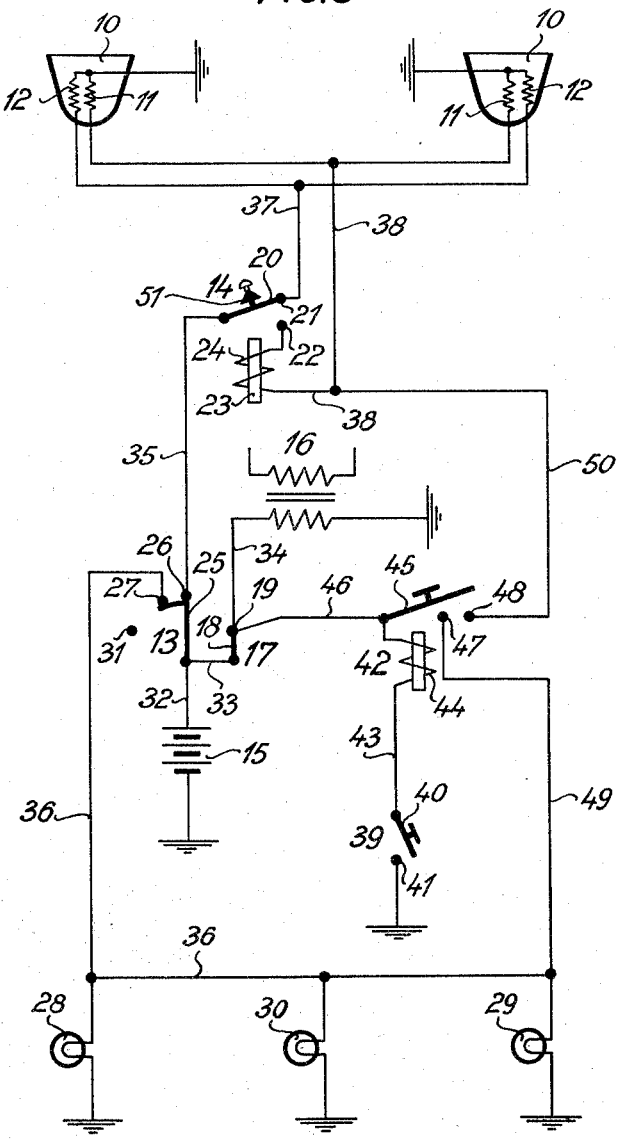
Fig. 3 is an electrical schematic diagram of still another arrangement of the present invention.

Referring to the drawings and more particularly to Fig. 1, it can be seen that a pair of spaced headlights 10 are provided, each having filaments 11 and 12 mounted therein. The filament 11 is the bright light beam emitting filament and the filament 12 is used for emitting the dim light beam. It can be seen that the filaments 11 and the filaments 12 are respectively connected in parallel with each other.

Also shown in Fig. 1 is the direct current source 15 which is usually the storage battery of the automotive vehicle and is used for energizing the headlights or light emitters. The negative terminal of the source 15 is connected to ground while the positive terminal is connected on a conductor 32 to the movable contact 25 of the main light switch 13. The switch 13 is also provided with three fixed contacts 26, 27 and 31.

The movable contact 25 of the switch 13 is also connected by a conductor 33 to the movable contact 18 of the ignition switch 17. The ignition switch 17 is the main ignition switch of the automotive vehicle and is provided with the fixed contact 19 which is connected by a conductor 34 to the primary winding of the ignition coil 16 of the car.

The fixed contact 26 of the main light switch 13 is connected by means of a conductor 35 to the movable contact 20 of the dimmer switch 14. The dimmer switch 14 has a fixed contact 21 and a fixed contact 22 with which the movable contact 20 may be moved into engagement. The fixed contact 21 is connected by a conductor 37 to the parallel connected dim filaments 12 while the fixed contact 22 is connected to the winding 24 of a holding coil and the conductor 38 to the parallel connected bright filaments 11.

The winding 24 is wound about a core 23 to provide electromagnetic holding means for the movable element 20 when the same is in contact with the fixed contact 22. Diagrammatically illustrated in a return spring 51 which normally urges the movable contact 20 of the dimmer switch 14 into engagement with the fixed contact 21 thereof.

To complete the circuit of Fig. 1, the fixed contact 27 of the main light switch 13 is connected by conductors 36 to the taillights 28 and 29 of the automotive vehicle and the identification light 30 which is conventionally used for illuminating the license plate of the automotive vehicle.

In operation, it can be seen that the main light switch 13 may be moved into engagement with the fixed contact 31 which is the off position of the light switch 13, or into engagement with the fixed contacts 26 and 27 thereof. In the illustrated position, as illustrated, the energizing means 15 provides energizing current for the dim filaments 12. It can be seen that current from the direct current source 15 flows through the conductor 32, the switch 13, the conductor 35, the dimer switch 14, and the conductor 37 to the filaments 12 in the illustrated position. Independent of the main light switch is the ignition switch 17, which in the illustrated on position provides energizing current from the direct current source 15 to the primary winding of the ignition coil 16 for the energizing of the engine of the automotive vehicle.

If it is desired to operate the bright light filaments 11 of the illustrated arrangement, the movable element 20 of the dimmer switch 14 is moved into its second circuit-closing position in contact with the fixed contact 22 against the action of the return spring 51. In this position current from the battery 15 flows through the holding coil 24 and the conductor 38 to the filaments 11 for emitting the bright light beam. When the current flows through the holding coil 24 it acts to maintain the movable element 20 in its second circuit-closing position against the action of the spring 51. That is, the return spring and the holding coil are so constructed and arranged that the magnetic holding flux produced by the combination of the coil 24 and the core 23 in the element 20 is sufficient to overcome the restoring force of the return spring 51.

If desired, the operator of the automotive vehicle may return the movable element 20 to its original illustrated position against the action of the magnetic holding means. It is clear that for such purposes, the manual force exerted by the operator is sufficient to overcome the difference between the magnetic holding flux and the restoring force of the return spring 51. In this manner, the dimmer switch 14 acts as the conventional dimmer switch, for all intents and purposes. However, it is not possible for the movable element 20 on the dimmer switch 14 to be in its second circuit-closing position, in contact with fixed contact 22, when the main switch 13 is operated into its off position, in contact with the fixed contact 31. In conventional arrangements, the dimmer switch would remain in its bright filament energizing position. With the illustrated arrangement, it is clear that there will no longer be any energizing current flowing through the holding coil 24. Accordingly there will be no magnetic holding flux produced by the core 23 to maintain the movable element 20 in its second circuit-closing position. Therefore the movable element 20 will be returned to the illustrated position by the return spring 51.

Accordingly, the next time that the main light switch 13 is operated to the illustrated position, it will only be possible for the dim light beam filaments 12 to be energized. It will again become necessary for the operator of the automotive vehicle to provide some positive action to move the movable element 20 against the action of the return spring 51 into engagement with the fixed contact 22 to produce the bright light beam. With the automatic operation produced by the circuit arrangement illustrated in Fig. 1, it is clear that it would be impossible for the headlights of an automotive vehicle to be switched on unintentionally in the bright position thereof when the main switch 13 is moved to its circuit-closing position.

Referring now to Fig. 2, wherein like parts have like numerals, it can be seen that the holding coil 24 is connected in series with the conductor 35 and the movable element 20 of the dimmer switch 14. Therefore, energizing current is always flowing through the winding 24 whenever the main switch 13 is in contact with the fixed contact 26. However, the spacing between the movable element 20 and the core 23 is too large to permit the produced magnetic flux in the core 23 to attract the movable member 20 thereto. Therefore, under normal operating conditions, the dimmer switch 14 will remain in the illustrated dim light beam producing position despite the production of the magnetic flux by the operation of the winding 24 and the core 23.

However, when the movable element 20 of the dimmer switch 14 is moved into the second circuit-closing position, in contact with the fixed contact 22, the air gap between the member 20 and the core 23 will be decreased. This decreased air gap brings the member 20 sufficiently close to the core 23 so that the latter will maintain the element 20 in the second circuit-closing position despite the action of the restoring spring 51. It is clear, that as before, this second circuit-closing position is the bright light beam producing position.

Therefore, when the main switch 13 is moved into the off position, the cessation of current flow through the holding coil 24 will cause the magnetic flux produced by the core 23 to collapse thereby permitting the return spring 51 to return the movable element 20 of the dimmer switch 14 back to the illustrated position in Fig. 2.

Referring now to Fig. 3, wherein like parts are identified by like numerals, an additional advantage of the arrangement constructed in accordance with the present invention will be illustrated. In this figure, connected to the fixed contact 19 of the ignition switch 17 is one end of a conductor 46, the other end of which is connected to the armature 45 of an electromagnetic relay 42. The element 45 is connected to one end of the magnetic winding 44, the other end of which is connected by a conductor 43 to the movable member 40 of a light signalling switch 39. The light signalling switch 39 is provided with a fixed contact 41 which is connected to the electrical ground.

The relay 42 is also provided with two fixed contacts 47 and 48. The contact 47 is connected by a conductor 49 to the taillights 28 and 29 and the identification light 30. The contact 48 is connected by means of a conductor 50 to one end of the holding winding 24, which end is connected by the conductor 38 to the filaments 11 for producing the bright light beams for the automotive vehicle.

In operation, the addition of the relay 42 and the light signalling switch 39 provides apparatus for using the bright light beams of the automotive vehicle and the taillights for light signalling purposes.

When the light signalling switch 39 has the movable element 40 thereof operated into engagement with the fixed contact 41, energizing current flows through the winding 44 of the relay 42 from the direct current source 15 through the ignition switch 17. When the winding 44 is energized, it attracts the armature 45 thereto and into electrical contact with the fixed contacts 47 and 48.

In this operated position of the relay 42, the filaments 11 for emitting the bright light beams are directly energized regardless of the relative positions of the main light switch 13 and the dimmer switch 14. This energization circuit is taken directly from the ignition switch 17, the operated armature 45, the fixed contact 48 and the conductors 50 and 38. Therefore with this circuit it is possible to energize the bright light beam filaments 11 merely by closing the switch 39 whether or not the headlights of the car had previously been on. By opening and closing the switch 39 through short time periods it is possible to provide signalling lights for the automotive vehicle, which signalling lights use the bright light beams thereof.

In the event that the illustrated positions of the switches 13 and 14 are maintained before the light signalling switch 39 is closed another advantageous operation is provided. That is, in the illustrated positions of the switches 13 and 14 of Fig. 3, the filaments 12 for producing the dim light beams are shown to be energized. Therefore when the light signalling switch 39 is closed, independently, the bright light beam producing filaments 11 are additionally energized so that as long as the switch 39 remains closed, both the filaments 11 and the filaments 12 will be energized.

On the other hand, if the switch 13 is in its illustrated on position and the dimmer switch 14 has been operated so that the bright light beam producing filaments 11 have been energized and are maintained in energized condition by the operation of the holding coil 24, still another operation is produced. For this circuit, when the light signalling switch 39 is closed, the holding coil 24 is short-circuited so that the movable element 20 of the dimmer switch 14 is moved back into the position wherein the filaments 12 are energized. This short-circuiting of the coil 24 is carried out as follows: The end of the winding 24 which is connected to the fixed contact 22 is connected to the positive pole of the direct current source 15 by the series connection of the movable elements 20, conductor 35, fixed contact 26, movable contact 25 of the switch 13 and the conductor 32. On the other hand the other end of the winding 24 is connected on the conductor 50, the fixed contact 48, the armature 45, the conductor 46, fixed contact 19, and movable contact 18 of the ignition switch 17, conductor 33 and conductor 32 to the positive terminal of the source 15.

It can be seen from the above that both ends of the winding 24 are at the same potential so that no current flows therethrough. Accordingly the magnetic flux produced by the winding 24 collapses when the relay 42 is operated. This permits the return spring 51 to return the movable element 20 of the switch 14 to the first circuit-closing position wherein the filaments 12 are energized. Therefore in this position both the filaments 11 and the filaments 12 will be energized.

Accordingly, with the arrangement of Fig. 3, if the switch 13 is in the off position, the bright light filaments can be energized independently by the light signalling switch 39 regardless of the positions of the switches 13 and 14. If the main light switch 13 is on and the dimmer switch 14 is in the dim light beam producing position, the operation of the switch 39 will cause both of the filaments to be energized so that both the dim and bright beams will be produced simultaneously. Finally, in the event that the main light switch 13 is on and the dimmer switch 14 is in the bright light beam producing position, the operation of the switch 39 will cause the dimmer switch to be returned to its dim light beam producing position while the bright light beam producing filaments 11 will be independently energized through the operating relay 42.

Of course it is apparent that in the event the ignition switch 17 is opened, the light signalling switch 39 will be rendered ineffective. This is a safety feature wherein it will be impossible to burn out the filaments or drain the battery by leaving the switch 39 closed when the ignition switch has been opened.

It should be noted that in the event that the bright light beam had been on before the operation of the blinking signalling switch 39, it would be necessary to again operate the dimmer switch 14 in order to energize the bright light beams after the light signalling switch 39 has functioned.

For additional safety features, all of the illustrated embodiments can have the restoring force of the return springs 51 and the magnetic flux producing members, namely the core 23 and the winding 24, so constructed and arranged that the opening of one of the filaments 11 will cause the dimmer switch 14 to be returned to its dim light beam producing position. That is, with the resistance of the two filaments 11 connected in parallel with each other and in series with the holding winding 24, a certain amount of current flows through the holding winding 24 which is of a sufficient magnitude to permit the production of sufficient flux for maintaining the movable member 20 in the bright light beam producing position against the action of the return spring 51.

However, in the event that one of the filaments 11 opens, the effective resistance in the holding coil circuit will be substantially increased. Therefore the amount of current flowing through the holding coil 24 will be decreased. By a proper choice of the variables, this decreased level of current will be insufficient to maintain the movable member 20 in the bright light beam producing position so that the return spring 51 will move the member 20 back to the illustrated dim light beam producing position. This is a safety feature, since it is normally impossible for the operator of the vehicle to determine while in the vehicle that one of the bright light filaments is not functioning. That is, when the operator operates the dimmer switch the change of the light beam from the headlights from the dim position to the bright position is readily apparent. However it is often impossible to tell whether both of the bright light beams of a two headlight car have been produced or whether only one has been produced. With the above-described arrangement, the operation of the dimmer switch will bring about no change in the light beams produced by the headlights so that the operator is aware of the open filaments even though one of the bright filaments 11 is still in good working order and would normally produce the bright beam.

It is possible with the arrangement shown in Fig. 3 to insert another blinking switch in series with the conductor 50 so as to rhythmically and uniformly open and close the circuit of the conductor 50 as long as the switch 39 is in the circuit-closing position thereof.

It will be understood that each of the elements described above, or two or more together, may also find a useful application in other types of lighting arrangements differing from the types described above.

While the invention has been illustrated and described as embodied in lighting arrangements for automotive vehicles, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Lighting arrangement for an automative vehicle comprising in combination, at least one light emitter having a first filament for emitting a dim light beam and a second filament for emitting a bright light beam upon energization thereof; energizing means connected in circuit with said filaments for energizing the same; first switch means connected in circuit between said energizing means and said filaments and being movable between a circuit-closing position wherein at least one of said filaments is energized and a circuit-opening position wherein said filaments are deenergized; a dimming switch connected in circuit between said first switch means and said filaments, said dimming switch being movable between a first position wherein an energization circuit for said first filament is completed and a second position wherein an energization circuit for said second filament is completed; means for normally urging said dimming switch into said first position thereof; and a holding coil connected in series with said first switch means in such a manner that when said dimming switch is in said second position thereof said dimming switch is held thereby in said second position against the action of said urging means as long as said coil is energized through said first switch means being in circuit-closing position, so that whenever said first switch means is moved from its circuit-opening position into its circuit-closing position, said dimming switch is bound to be in its first position causing emission of a dim light beam.

2. Lighting arrangement for automotive vehicles comprising in combination, at least two light emitters, each of said emitters having a first filament connected in parallel with the first filament of the other light emitter and a second filament connected in parallel with the second filament of the other light emitter, said emitters emitting respective light beams on energization thereof; energizing means connected in circuit with said filaments for energizing the same; first switch means connected in circuit between said energizing means and said filaments and being movable between a circuit-closing position wherein at least one of said filaments is energized and a circuit-opening position wherein said filaments are deenergized; second switch means connected in circuit between said first switch means and said filaments and being movable between a first circuit-closing position wherein said first filaments are energized and a second circuit-closing position wherein said second filaments are energized, said second switch means including electromagnetic holding means connected in series with said first switch means; and means for normally urging said second switch means into said first circuit-closing position thereof whereby when said first switch means is in circuit-closing position thereof and said second switch means is in said second circuit-closing position thereof, current flows through said first switch and said electromagetic holding means to maintain said second switch means in said second circuit-closing position thereof against the action of said urging means as long as said electromagnetic holding means is sufficiently energized through said first switch means being in its circuit-closing position, said urging means and said electromagnetic holding means being so constructed and arranged that the open circuiting of at least one of said second parallel connected filaments will decrease the amount of current flowing through said electromagnetic holding means below the level necessary for said electromagnetic holding means to maintain said second switch means in said second circuit-closing position thereof against the action of said urging means so that said urging means will return said second switch means into said first circuit-closing position thereof.

3. Lighting arrangement for automotive vehicles comprising in combination, at least one light emitter having a first and a second filament for emitting respective light beams upon energization thereof; energizing means connected in circuit with said filaments for energizing the same; first switch means connected in circuit between said energizing means and said filaments and being movable between a circuit-closing position wherein at least one of said filaments is energized and a circuit-opening position wherein said filaments are deenergized; second switch means connected in series between said first switch means and said filaments and being movable between a first circuit-closing position wherein said first filament is energized and a second circuit-closing position wherein said second filament is energized; means for normally urging said second switch means into said first circuit-closing position thereof; and a holding coil connected in series between said first and second switch means for holding said second switch means in said second circuit-closing position against the action of said urging means whenever said second switch means is moved into said second circuit-closing position thereof as long as said coil is energized through said first switch means being in its circuit-closing position, so that whenever said first switch means is moved from its circuit-opening position into its circuit-closing position, said second switch means is bound to be in its first circuit-closing position causing emission of light from said first filament.

4. Lighting arrangement for automotive vehicles comprising in combination, at least two light emitters, each of said emitters having a first filament connected in parallel with the first filament of the other light emitter and a second filament connected in parallel with the second filament of the other light emitter, said emitters emitting respective light beams on energization thereof; energizing means connected in circuit with said filaments for energizing the same; first switch means connected in circuit between said energizing means and said filaments and being movable between a circuit-closing position wherein at least one of said filaments is energized and a circuit-opening position wherein said filaments are deenergized; second switch means connected in series between said first switch means and said filaments and being movable between a first circuit-closing position wherein said first filaments are energized and a second circuit-closing position wherein said second filaments are energized; means for normally urging said second switch means into said first circuit-closing position thereof; and a holding coil connected in series between said first and second switch means for holding said second switch means in said second circuit-closing position thereof whenever said second switch means is moved into said second circuit-closing position as long as said coil is energized through said first switch means being in its circuit-closing position, so that whenever said first switch means is moved from its circuit-opening position into its circuit-closing position, said second switch means is bound to be in its first circuit-closing position causing emission of light from said first filament, said urging means and said holding coil being so constructed and arranged that the open circuiting of at least one of said second parallel connected filaments will decrease the amount of current flowing through said holding coil below the level necessary for the same to maintain said second switch means in said second circuit-closing position thereof, so that said urging means moves said second switch means back into said first circuit-closing position thereof.

5. Lighting arrangement for automotive vehicles comprising in combination, at least one light emitter having a first and a second filament for emitting respective light beams upon energization thereof; energizing means connected in circuit with said filaments for energizing the same; first switch means connected in circuit between said energizing means and said filaments and being movable between a circuit-closing position wherein at least one of said filaments is energized and a circuit-opening position wherein said filaments are deenergized; second switch means connected in circuit between said first switch means and said filaments and being movable between a first circuit-closing position wherein said first filament is energized and a second circuit-closing position wherein said second filament is energized, said second switch means including electro-magnetic holding means connected in series with said first switch means; means for normally urging said second switch means into said first circuit-closing position thereof whereby when said first switch means is in circuit-closing position thereof and said second switch means is in said second circuit-closing position thereof, current flows through said first switch and said electromagnetic holding means to maintain said second switch means in said second circuit-closing position thereof against the action of said urging means as long as said electromagnetic holding means is sufficiently energized through said first switch means being in its circuit-closing position; and third switch means connected in circuit between said energizing means and one of said filaments for energizing said one filament regardless of the position of said first and second switch means, whenever desired.

6. Lighting arrangement for automotive vehicles comprising in combination, at least one light emitter having a first and a second filament for emitting respective light beams upon energization thereof; energizing means connected in circuit with said filament for energizing the same; first switch means connected in circuit between said energizing means and said filaments and being movable between a circuit-closing position wherein at least one of said filaments is energized and a circuit-opening position wherein said filaments are deenergized; second switch means connected in circuit between said first switch means and said filaments and being movable between a first circuit-closing position wherein one of said filaments is energized and a second circuit-closing position wherein said other filament is energized, said second switch means including electromagnetic holding means connected in series with said first switch means; means for normally urging said second switch means into said first circuit-closing position thereof whereby when said first switch means is in circuit-closing position thereof and said second switch means is in said second circuit-closing position thereof, current flows through said first switch and said electromagnetic holding means to maintain said second switch means in said second circuit-closing position thereof against the action of said urging means; and third switch means connected in circuit between said energizing means as long as said electromagnetic holding means is sufficiently energized through said first switch means being in its circuit-closing position and one of said filaments and movable between a circuit-opening position and a circuit-closing position wherein said electromagnetic holding means is short-circuited and said one filament is energized regardless of the position of said first and second switch means.

7. Lighting arrangement for automotive vehicles comprising in combination, at least two light emitters, each of said light emitters having a first filament for emitting a dim light beam and a second filament for emitting a bright light beam, respectively, said first filaments and said second filaments being respectively connected in parallel; energizing means connected in circuit with said filaments for energizing the same; first switch means connected in circuit between said energizing means and said filaments and being movable between a circuit-closing position wherein at least one of said filaments is energized and a circuit-opening position wherein said filaments are deenergized; a dimming switch connected in circuit between said first switch means and said filaments, said dimming switch being movable between a first position wherein an energization circuit for said first filaments is completed and a second position wherein an energization circuit for said second filaments is completed; means for normally urging said dimming switch into one of its positions thereof; a holding coil connected in series with said first switch means when dimming switch is in the other position thereof for holding said dimming switch in said other position against the action of said urging means as long as said coil is energized through said first switch means being in circuit-closing position, so that whenever said first switch means is moved from its circuit-opening position into its circuit-closing position, said dimming switch is bound to be in its first position causing emission of a dim light beam; an electromagnetic relay connected in circuit between said first switch means and said first filaments, said electromagnetic relay having a magnetic winding in circuit with said energizing means, a fixed contact connected to said first filaments, and a movable armature for engaging said fixed contact at a free end portion of said armature, the other end of said armature being connected to said first switch means, said electromagnetic relay being in a circuit-opening position when said free end portion of said armature is out of contact with said fixed contact thereof and in circuit-closing position when said free end portion of said armature is in electrical contact with said fixed contact whereby said first filaments are energized regardless of the position of said dimming switch, and whereby said holding coil is short-circuited so that said dimming switch returns to its fixed position if it was in its second position; and signaling switch means connected in circuit between said energizing means and said magnetic winding and being movable between a circuit-opening position and a circuit-closing position wherein said electromagnetic relay is energized to move into its circuit-closing position whereby said first filaments are energized for signaling purposes whenever said signaling switch is moved into its circuit-closing position.

8. Lighting arrangement as set forth in claim 7, wherein said electromagnetic relay has a second fixed contact capable of being engaged by said free end portion of said armature when said relay is in its circuit-closing position, and wherein auxiliary circuit means including at least one auxiliary light emitter are connected in circuit with said energizing means, said auxiliary circuit means being connected with said first switch means for energization of said auxiliary light emitter when said first switch means are in circuit-closing position, said auxiliary circuit means being additionally connected to said second fixed contact of said electromagnetic relay for energization of said auxiliary light emitter for signaling purposes when said relay is in circuit-closing position.

9. Lighting arrangement for an automotive vehicle comprising in combination, at least one light emitter having a first filament for emitting a dim light beam and a second filament for emitting a bright light beam upon energization thereof; energizing means connected in circuit with said filaments for energizing the same; first switch means connected in circuit between said energizing means and said filaments and being movable between a circuit-closing position wherein at least one of said filaments is energized and a circuit-opening position wherein said filaments are deenergized; an ignition switch for operating the ignition of said automotive vehicle, said ignition switch being movable between circuit-closing and circuit-opening positions when operated; a dimming switch connected in circuit between said first switch means and said filaments, said dimming switch being movable between a first position wherein an energization circuit for said first filament is completed and a second position wherein an energization circuit for said second filament is completed; means for normally urging said dimming switch into said first position thereof; and a holding coil connected in series with said first switch means when said dimming switch is in said second position thereof for holding said dimming switch in said second position against the action of said urging means as long as said coil is energized through said first switch means being in circuit-closing position, so that whenever said first switch means is moved from its circuit-opening position into its circuit-closing position, said dimming switch is bound to be in its first position causing emission of a dim light beam.

References Cited in the file of this patent

UNITED STATES PATENTS

| | | |
|---|---|---|
| 1,020,555 | Horton | Mar. 19, 1912 |
| 2,045,274 | Kundig | June 23, 1936 |
| 2,177,618 | Montgomery et al. | Oct. 24, 1939 |
| 2,751,575 | Jacobs et al. | June 19, 1956 |

FOREIGN PATENTS

| | | |
|---|---|---|
| 746,126 | Great Britain | Mar. 7, 1956 |